(12) United States Patent
Ariga et al.

(10) Patent No.: US 6,964,441 B2
(45) Date of Patent: Nov. 15, 2005

(54) BUMPER SPOILER AND BUMPER STRUCTURE

(75) Inventors: Hirotoshi Ariga, Aichi (JP); Yukiko Tsuya, Aichi (JP); Tatsuya Tamura, Kanagawa (JP)

(73) Assignee: Tokai Kogyo Co., Ltd., Obu (JP)

( * ) Notice: Subject to any disclaimer, the term of this patent is extended or adjusted under 35 U.S.C. 154(b) by 0 days.

(21) Appl. No.: 10/694,875

(22) Filed: Oct. 29, 2003

(65) Prior Publication Data

US 2004/0135383 A1    Jul. 15, 2004

(30) Foreign Application Priority Data

Oct. 29, 2002  (JP)  ............................. 2002-313746

(51) Int. Cl.[7] ............................................. B62D 37/02
(52) U.S. Cl. ....................... 293/117; 293/34; 296/180.1
(58) Field of Search .......................... 293/117, 34, 123, 293/120, 121; 296/180.1

(56) References Cited

U.S. PATENT DOCUMENTS 6,644,700 B2    11/2003   Ito et al.

FOREIGN PATENT DOCUMENTS

| JP | 10250640 A | * | 9/1998 | .......... B62D 37/02 |
| JP | 11139353 A | * | 5/1999 | .......... B62D 37/02 |
| JP | 2000-6007 | | 9/2000 | |

OTHER PUBLICATIONS

Machine Assisted Translation of JP11-139353, 2005.*
Machine-Assisted Translation of JP10-250640, 2005.*

* cited by examiner

Primary Examiner—Patricia L. Engle
(74) Attorney, Agent, or Firm—Oblon, Spivak, McClelland, Maier & Neustadt, P.C.

(57) ABSTRACT

A bumper spoiler to be mounted on a bumper of a vehicle, includes a bumper spoiler main body section to be disposed to orient toward a roadbed on which the vehicle travels, when mounted on the bumper; a plurality of insert/mount sections each formed on a back of the spoiler main body section integrally therewith to protrude rearward of the vehicle; and a plurality of fixing sections integrally formed on the plurality of insert/mount sections respectively and each protruding from a position between the spoiler main body section and a rear end of each of the insert/mount section to be fixed to the bumper.

33 Claims, 12 Drawing Sheets

BUMPER SPOILER AND BUMPER STRUCTURE

BACKGROUND OF THE INVENTION

1. Field of the Invention

The invention relates to a bumper spoiler which is attached to a front bumper of a vehicle and reduces air resistance which arises during traveling of the vehicle, to thereby improve fuel economy of the vehicle, as well as to a bumper structure including the bumper and the bumper spoiler.

2. Background Art

A conventionally-known bumper spoiler (hereinafter often abbreviated as "spoiler") is embodied by forming a strip-shaped spoiler from hard ABS resin or the like by means of injection molding, and attaching the spoiler to a lower end of a front bumper (hereinafter often abbreviated as "bumper") with screws or the like. In relation to another related-art spoiler, a mount section—which has a metal core embedded therein and assumes a substantially-U-shaped cross-sectional profile—is attached integrally to the back of an upper end section of the spoiler main body section formed from elastic rubber. An elastic contact shield piece is provided integrally on the front surface of the upper end section of the spoiler main body section. Such a spoiler main body section is formed into a long form through injection molding. The spoiler main body section is cut to a predetermined length, and the resultant piece of predetermined length is attached to the bumper by way of the mount section such that the elastic contact shield piece comes into elastic contact with a lower surface of the bumper while being oriented forward. (See Technical Report published by Japan Institute of Invention and Innovation, Published Technical Report No. 2000-6007)

In view of the objective of the former bumper spoiler and the mount structure thereof, the bumper spoiler is attached to a portion of the bumper comparatively close to a road surface. The spoiler is formed from hard material. For this reason, if during traveling of the vehicle the spoiler has come into contact with the road surface or an obstruction on the road surface, the spoiler will be vulnerable to fracture.

In relation to the latter bumper spoiler and the mount structure thereof, the mounting of the spoiler to the bumper does not remain stable. The position of the spoiler sometimes becomes displaced because of vibration developing during the course of traveling of the vehicle or variations in air resistance.

SUMMARY OF THE INVENTION

The present invention aims at providing a bumper spoiler which has a superior capability for mounting the spoiler on a front bumper and a characteristic of preventing the spoiler from being fractured even when a portion of the spoiler has come into contact with a road surface, as well as a bumper structure using the spoiler.

The invention provides a bumper spoiler to be mounted on a bumper of a vehicle, including: a bumper spoiler main body section to be disposed to orient toward a roadbed on which the vehicle travels, when mounted on the bumper; a plurality of insert/mount sections each formed on a back of the spoiler main body section integrally therewith to protrude rearward of the vehicle; and a plurality of fixing sections integrally formed on the plurality of insert/mount sections respectively and each protruding from a position between the bumper spoiler main body section and a rear end of each of the insert/mount section to be fixed to the bumper.

Preferably, the plurality of fixing sections are capable of being fixed in the vicinities of a plurality of mount holes formed in the bumper.

According to the invention, in order to mount a spoiler to a bumper of a vehicle, the only requirement is to press and insert the insert mount sections to mount holes of the bumper, whereupon the fixing sections formed integrally in the insert/mount sections are fixed to the vicinity of the mount holes, thereby preventing forward removal of the inserted bumper spoiler from the bumper. Therefore, an operation for attaching the bumper spoiler to the bumper becomes easy.

Preferably, the plurality of fixing sections have substantially the same cross-section in a longitudinal direction of the spoiler main body section.

According to the invention, when unnecessary portions are partially removed from a long member having a uniform transverse cross-sectional profile, the insert/mount sections and the fixing sections can be formed. Hence, the bumper spoiler can be easily manufactured at low cost.

Preferably, the bumper spoiler further includes a fitting base section extending along the spoiler main body section; wherein the fitting base section is integrally formed with the plurality of insert/mount sections.

According to the invention, the fitting base section which can be made by removal of an unnecessary section from a long member having a uniform transverse cross-sectional profile. The fitting base section may be fitted into the mount groove of the bumper or the like so that a mounted state of the spoiler to the bumper in the longitudinal direction becomes stable.

Preferably, the plurality of insert/mount sections includes at least an insert/mount section having a fastening member mount portion for attaching a fastening member.

According to the invention, when the spoiler is mounted on the bumper, in addition to utilization of latching force of the spoiler to the mount holes of the bumper, fastening force of the fastening members attached to the fastening member mount portion can also be utilized. An increase in the fastening force of the spoiler to the bumper becomes greater, thereby rendering the mounted state of the spoiler stable.

Preferably, the fastening member mount portion is formed at a position where the fastening member attached to the fastening member mount portion does not interfere with the fixing section.

Preferably, the fastening member mount portion is a fastening member insert hole into which the fastening member can be inserted.

According to the invention, the fastening member is attachable by means of inserting operation, and hence the task of attaching the fastening members becomes easy.

Preferably, the plurality of insert/mount sections includes an insert/mount section with a fastening member insert hole for attaching a fastening member and an insert/mount section without the fastening member insert hole.

According to the invention, some of the plurality of insert/mount sections are not provided with the fastening member insert holes, and when the spoiler is mounted on the bumper through use of the fastening members, the insert/mount sections are fastened to only required ones of the fastening member insert holes through use of the fastening members. Consequently, when compared with a case where all insert/mount sections are fastened through use of the fastening members, the number of locations where the insert/mount sections are mounted becomes smaller, thereby enhancing the efficiency of mounting of the spoiler.

Preferably, the fastening member insert hole is formed at a position where the fastening member attached to the fastening member mount hole does not interfere with the fixing section.

Preferably, the insert/mount section with a fastening member insert hole and the insert/mount section without the fastening member insert hole are arranged alternately with each other.

Preferably, the spoiler main body section is formed from soft, flexible material which does not undergo any deformation in excess of a limit when subjected to air resistance developing during the course of travel of a vehicle; the plurality of insert/mount sections are formed from material which is hard and higher in rigidity than a material of the spoiler main body section; and the back of the spoiler main body section and extremity base portions of the plurality of insert/mount sections are joined integrally with each other.

According to the invention, the insert/mount sections are formed from a material which is hard and has rigidity higher than that of the bumper main body section. Hence, the state in which the spoiler is mounted on the bumper by way of the insert/mount sections becomes stable.

Preferably, the spoiler main body section and the insert/mount sections are made of at least one of rubber and a thermoplastic elastomer material.

According to the invention, the spoiler main body section and the insert/mount sections are formed from the same material and possess compatibility. Hence, there is produced a spoiler into which the spoiler main body section and the insert/mount sections are fixedly joined together by means of thermal welding during extrusion.

Preferably, the bumper spoiler further includes: a core material made of a material higher in rigidity and expansion-and-contraction resistance than the spoiler main body section and the insert/mount sections, the core material embedded in the longitudinal direction in an area on the back of the spoiler main body section where the plurality of insert/mount sections are to be joined.

According to the invention, the core material imparts rigidity to the spoiler over the entire length thereof, and expansion and contraction of the spoiler are also prevented.

Preferably, the plurality of fixing sections are formed on one of upper and lower sides of the respective insert/mount sections; and, when the spoiler is attached to the bumper, the plurality of fixing sections are elastic in a direction moving away from the plurality of insert/mount sections, thereby enabling the plurality of insert/mount sections to be pressed against corresponding areas on the bumper.

Accordingly, when the insert/mount sections of the spoiler are inserted into the mount holes of the bumper, some of the fixing sections formed integrally on the insert/mount sections penetrate through to the back of the mount holes, and free end sections of the fixing sections are elastically latched with the upper or lower edges of the mount holes, whereby the insert/mount sections can be pressed against corresponding areas on the bumper. Therefore, clearance does not arise between the insert/mount sections of the spoiler and corresponding surfaces on the spoiler mount plate section of the bumper, and hence the spoiler is fixedly attached to the bumper. Further, the task of inserting the fastening members into the fastening member insert holes formed in the insert/mount sections becomes easy.

The invention provides a method of producing a bumper spoiler to be mounted on a bumper, wherein the bumper spoiler includes: a bumper spoiler main body section to be disposed to orient in substantially a vertical direction when mounted on the bumper; a plurality of insert/mount sections each formed on a back of the spoiler main body section integrally therewith to protrude rearward of the vehicle; and a plurality of fixing sections integrally formed on the plurality of insert/mount sections respectively and each protruding from a position between the bumper spoiler main body and a rear end of each of the insert/mount section to be fixed to the bumper, the method including: extruding a long member formed so as to assume a constant cross-sectional profile, the long member including the spoiler main body section integrated with a preliminary insert/mount section formation section and a preliminary fixing section formation section, continuously in a longitudinal direction; and removing apart of the preliminary insert/mount section formation sections and the preliminary fixing section formation sections from the long member so as to leave the plurality of insert/mount sections and the plurality of fixing sections spaced at predetermined intervals.

The invention provides a bumper structure of a vehicle, including: a bumper of the vehicle; and a bumper spoiler attached to the bumper; wherein the bumper includes a mount portion formed in a transverse direction of the vehicle, and a plurality of mount holes formed at predetermined intervals in the transverse direction of the vehicle, penetrating through the mount portion; and the bumper spoiler includes: a bumper spoiler main body section to be disposed to orient toward a roadbed on which the vehicle travels, when mounted on the bumper, a plurality of insert/mount sections each formed on a back of the spoiler main body section integrally therewith to protrude rearward of the vehicle, and a plurality of fixing sections integrally formed on the plurality of insert/mount sections respectively and each protruding from a position between the bumper spoiler main body section and a rear end of each of the insert/mount section to be fixed to the vicinities of the plurality of mount holes.

Preferably, a transverse dimension of the mount hole is made greater than a longitudinal width of a base section of the insert/mount section.

According to the invention, even when a difference arises in the amount of thermal expansion or thermal contraction between the bumper and the spoiler for reasons of a change in temperature during the course of use of the spoiler, the difference is effectively absorbed, and the tensile force or compression force arising in the longitudinal direction does not affect the spoiler.

BRIEF DESCRIPTION OF THE DRAWINGS

The present invention may be more readily described with reference to the accompanying drawings, in which.

DETAILED DESCRIPTION OF THE PREFERRED EMBODIMENTS

Figure 1:
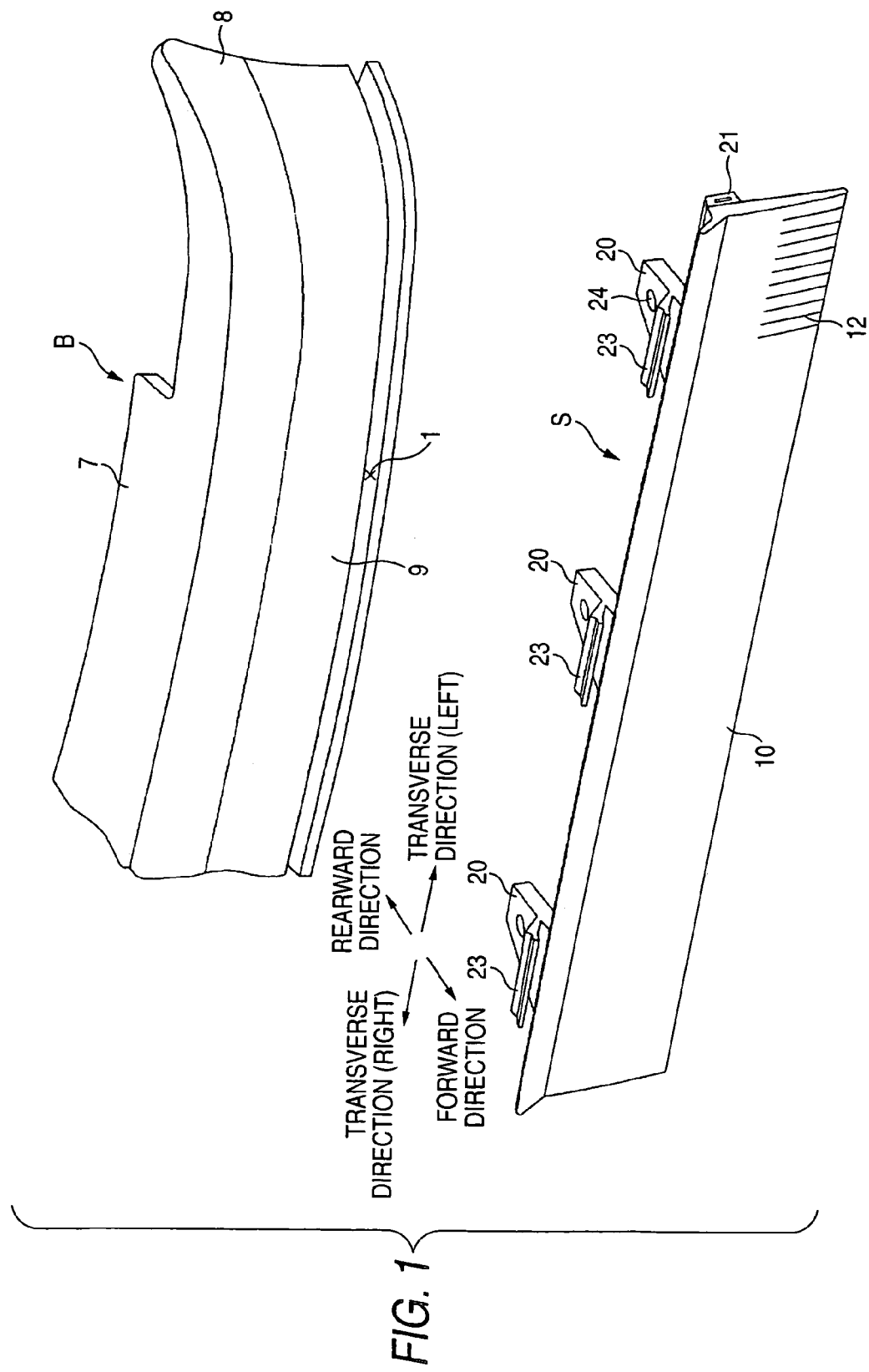
FIG. 1 is a fragmentary perspective view showing a bumper spoiler according to the invention and a left half a front bumper to be mounted on the bumper spoiler.
Figure 2:
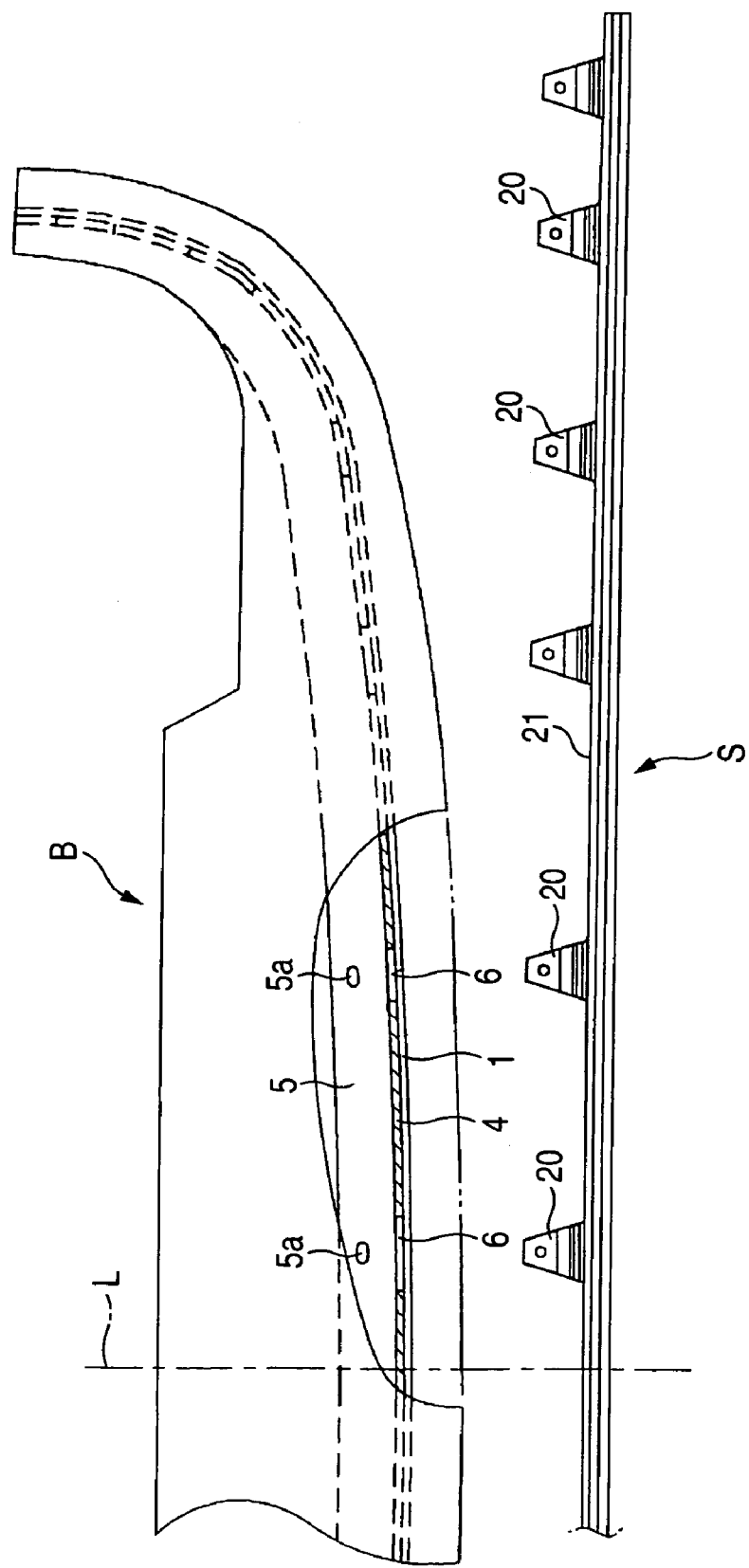
FIG. 2 is a plan view corresponding to FIG. 1.
Figure 3:
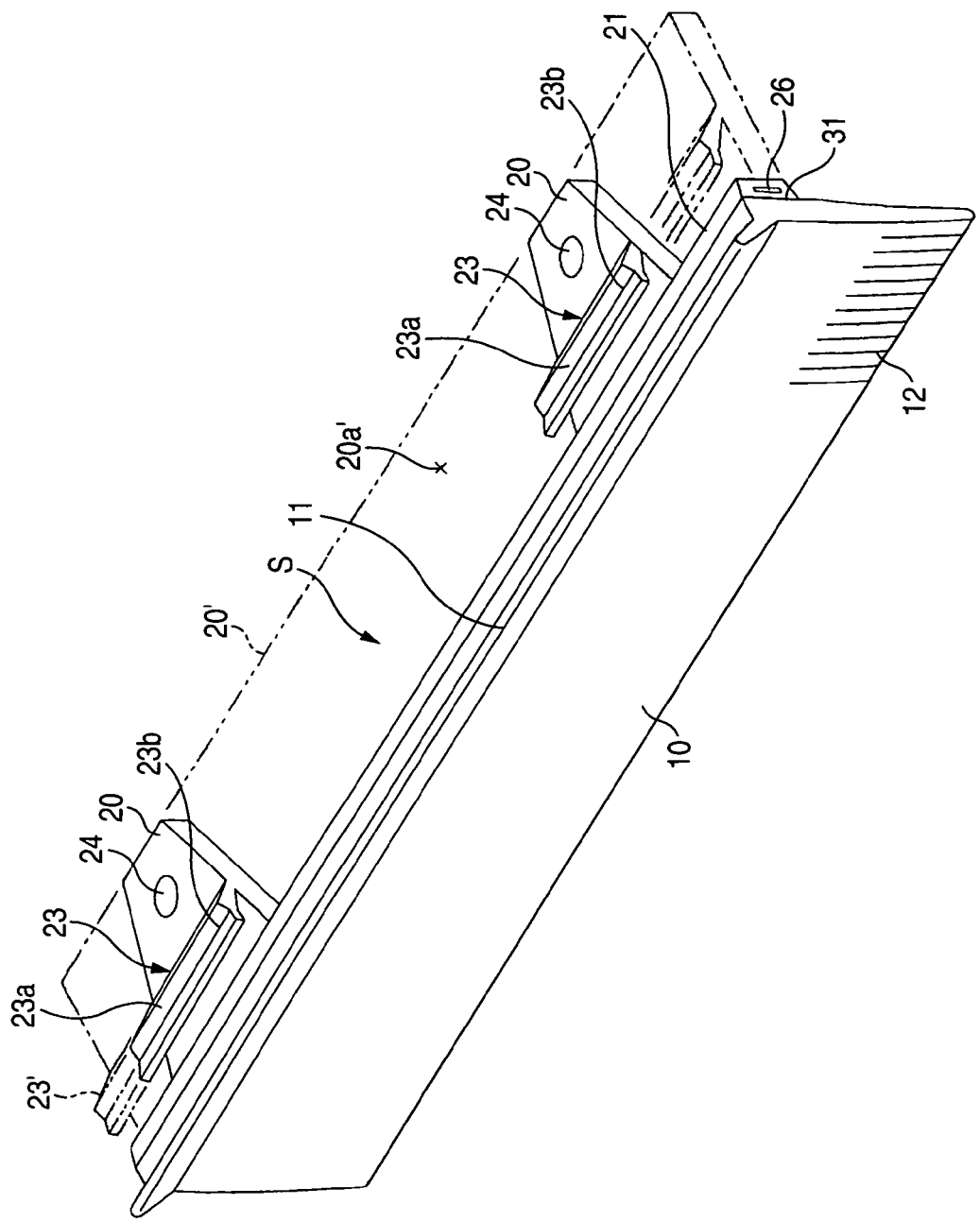
FIG. 3 is a fragmentary perspective view of the bumper spoiler formed by removing an unwanted section from a preliminary insert/mount section formation section of a bumper spoiler remaining in the state of an intermediate product.
Figure 4:
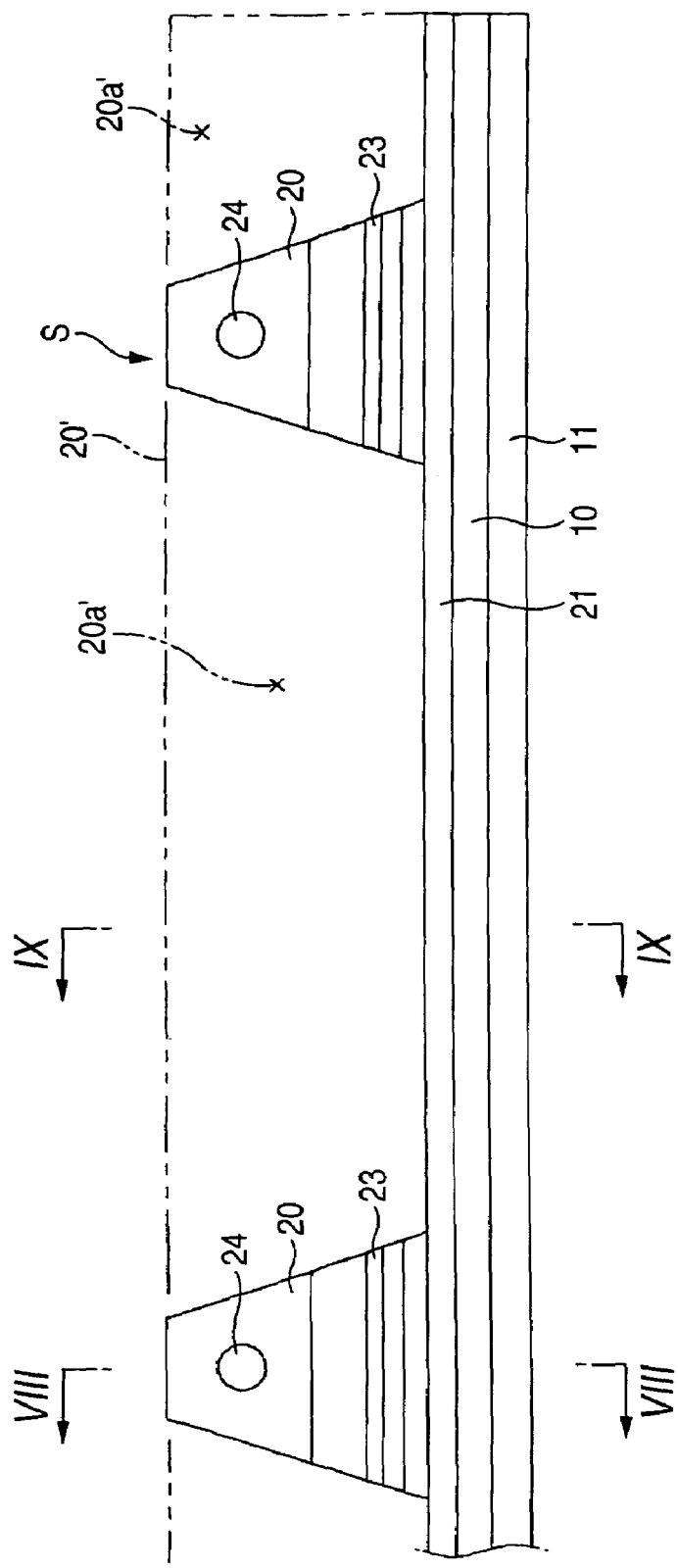
FIG. 4 is a plan view corresponding to FIG. 3.

The invention will be described in more detail by reference to a plurality of embodiments. FIG. 1 is a fragmentary perspective view showing a bumper spoiler S according to the invention, and a left half of a front bumper B to which the bumper spoiler S is to be mounted. FIG. 2 is a corresponding plan view, and FIG. 3 is a fragmentary perspective view of the bumper spoiler S formed by removing an unwanted section 20a' from a preliminary insert/mount section formation section 20' of a bumper spoiler S' remaining in the state of an intermediate product. FIG. 4 is a corresponding plan view. The bumper spoiler S will first be described in connection with portions of the spoiler to be mounted to the front bumper B, and then a structure for mounting the spoiler S to the front bumper B will be described.

As shown in FIGS. 1 through 4, the spoiler S assumes a long shape which is symmetrical about a center line L passing through a front surface of a vehicle with respect to a transverse direction thereof (see FIG. 2). The spoiler S comprises a spoiler main body section 10 which is disposed to orient toward a roadbed on which the vehicle travels, while being attached to the front bumper B and assumes a slit shape; substantially-plate-shaped insert/mount sections 20 which project from upper end sections of the spoiler main body section 10 toward the back (i.e., rearward of the vehicle); and latching (fixing) sections 23. The spoiler main body section 10 is formed from a material which is softer than the insert/mount section 20 to be described later and elastically deformable; for example, soft rubber or TPE resin (preferably JIS K7215 durometer hardness HDA 70° or less) or the like. The insert/mount section 20 is formed from rubber or synthetic resin material which is harder than the spoiler main body section 10 and possesses rigidity; for example PP resin or hard TPE resin (preferably JIS K7215 durometer hardness HDD 50° or thereabouts) or the like. Joint sections 31 (see FIG. 3) between the spoiler main body section 10 and the insert/mount section 20 are preferably integrated together by means of welding when both sections are formed through extrusion, and maintain high joint strength. Material of the TPE (thermoplastic elastomer) is not limited to any particular material. For instance, vinyl-based TPE, olefin-based TPE (hereinafter simply abbreviated as "TPO"), styrene-based TPE, or the like can be applied to the TPE. However, from the viewpoint of weight reduction and environmental protection, use of TPO is preferable. Specifically, so long as both the main body section 10 of the spoiler S and the insert/mount section 20 are formed from TPO, there arises an advantage of the ability to dispose of the spoiler S by incineration even when the spoiler has become unnecessary and discarded, and an advantage of evolution of no toxic gas. Materials other than TPE include soft rubber material which is preferable for the main body section 10, and hard rubber material, particularly EPDM, which is preferable for the insert/mount section 20.

Figure 8:
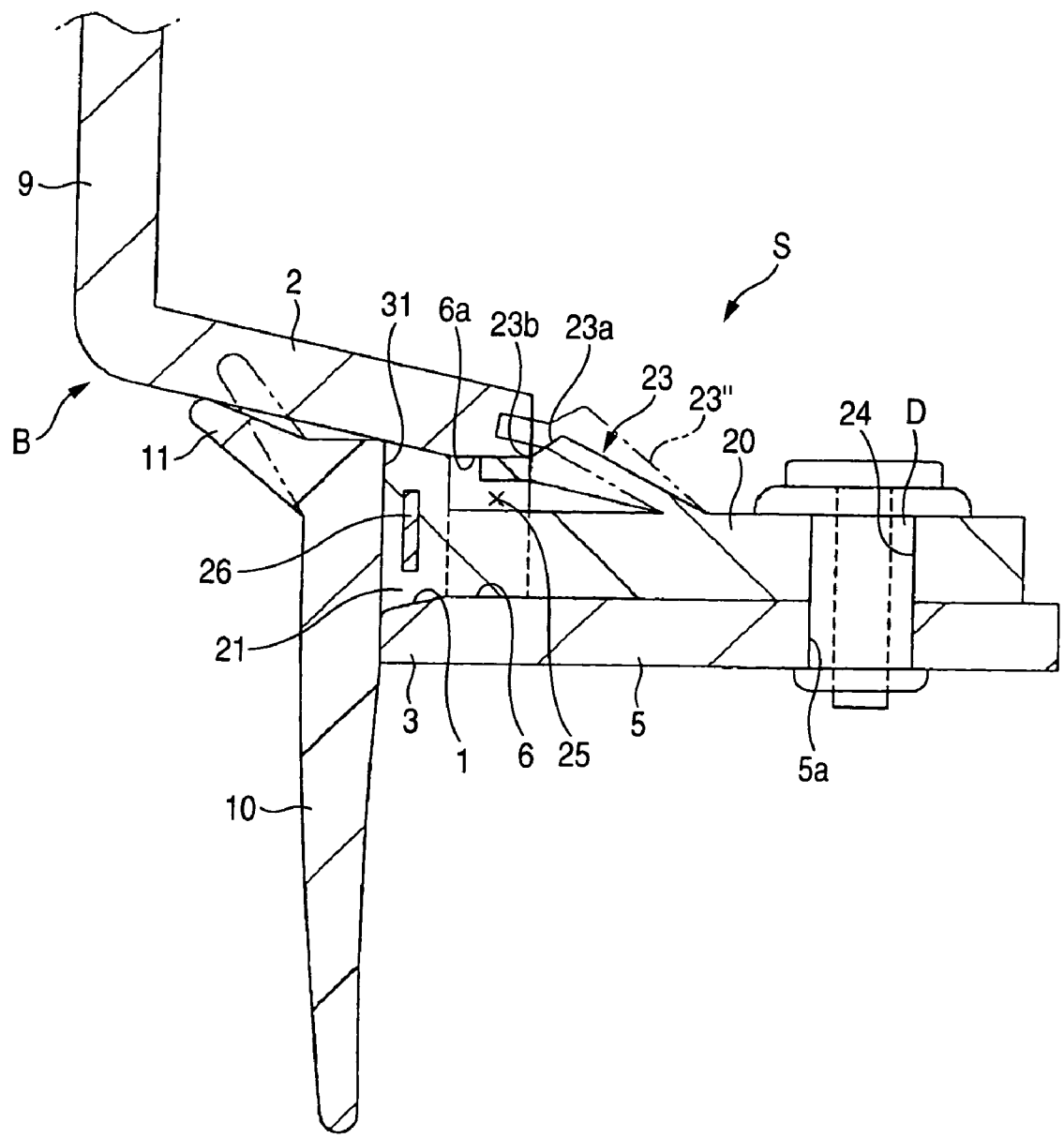
FIG. 8 is an enlarged cross-sectional view taken along line VIII—VIII shown in FIG. 4 when the spoiler is mounted on the bumper.
Figure 9:
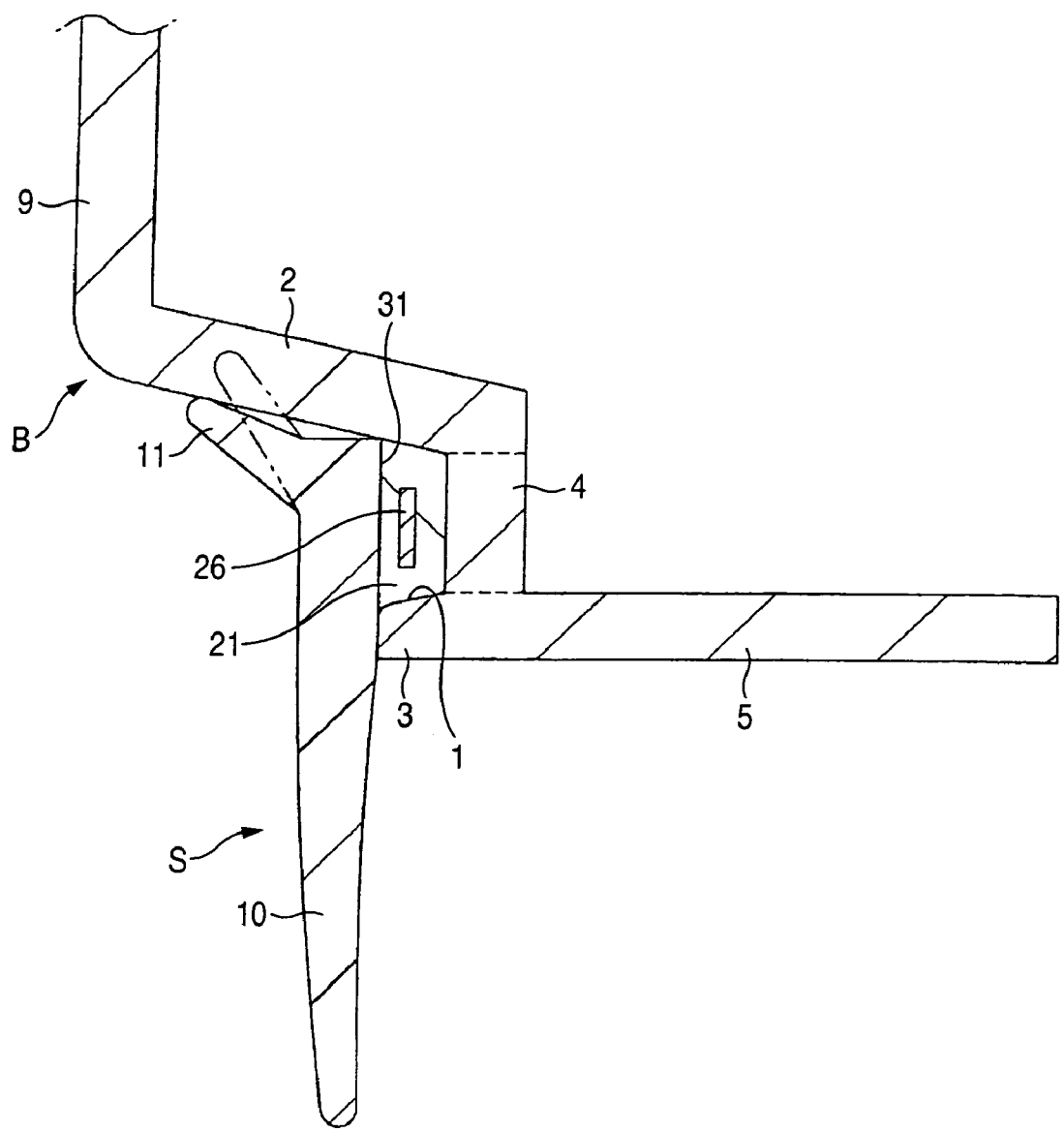
FIG. 9 is an enlarged cross-sectional view taken along line IX—IX shown in FIG. 4 in the same state.

A fitting base section 21 which is to fit into a spoiler mount groove 1 of the front bumper B (see FIGS. 1, 8, and 9) is provided on the front-end portions of the insert/mount sections 20 (i.e., portions of the insert/mount sections facing the spoiler main body section 10) over the entire length of the spoiler main body section 10. The insert/mount sections 20 are slightly tapered down to the tips thereof and are integrally formed on the fitting base section 21 so as to project from the fitting base section 21 toward the back and are spaced at predetermined intervals in a longitudinal direction of the front bumper. The fitting base section 21 and the respective insert/mount sections 20 are formed integrally from the same material. The fitting base section 21 is thicker than the insert/mount section 20. A predetermined step is formed between the fitting section 21 and the insert/mount sections 20. As shown in FIGS. 8 and 9, the spoiler mount groove 1 of the bumper B is formed from three wall sections; that is, an upper-groove-side wall section 2, a lower-groove-side wall section 3, and a groove bottom wall section 4, such that the front side of the spoiler mount groove 1 becomes open. Spoiler mount plate sections 5 are integrally, continuously provided on the lower-groove-side wall section 3 so as to face rearward of the vehicle. Insert/mount holes 6 (see FIGS. 1 and 8) to be inserted into the mount/insert sections 20 of the spoiler S are provided on the groove bottom wall section 4 constituting the spoiler mount groove 1 in the longitudinal direction of the bumper B (i.e., the transverse direction of the vehicle) at the same intervals as those at which the insert/mount sections 20 are provided. In the case where the bumper B wraps around side sections of the vehicle by way of the corner sections, the insert/mount holes 6 are provided so as to be spaced apart from each other in the longitudinal direction of the vehicle. In FIG. 1, reference numeral 7 designates a bumper main body section; 8 designates a bumper side edge section; and 9 designates the front surface of the bumper. FIG. 1 illustrates the front, rearward, and transverse directions of the vehicle in the form of arrows. The bumper B is arranged in the transverse direction of the vehicle.

Figure 10:
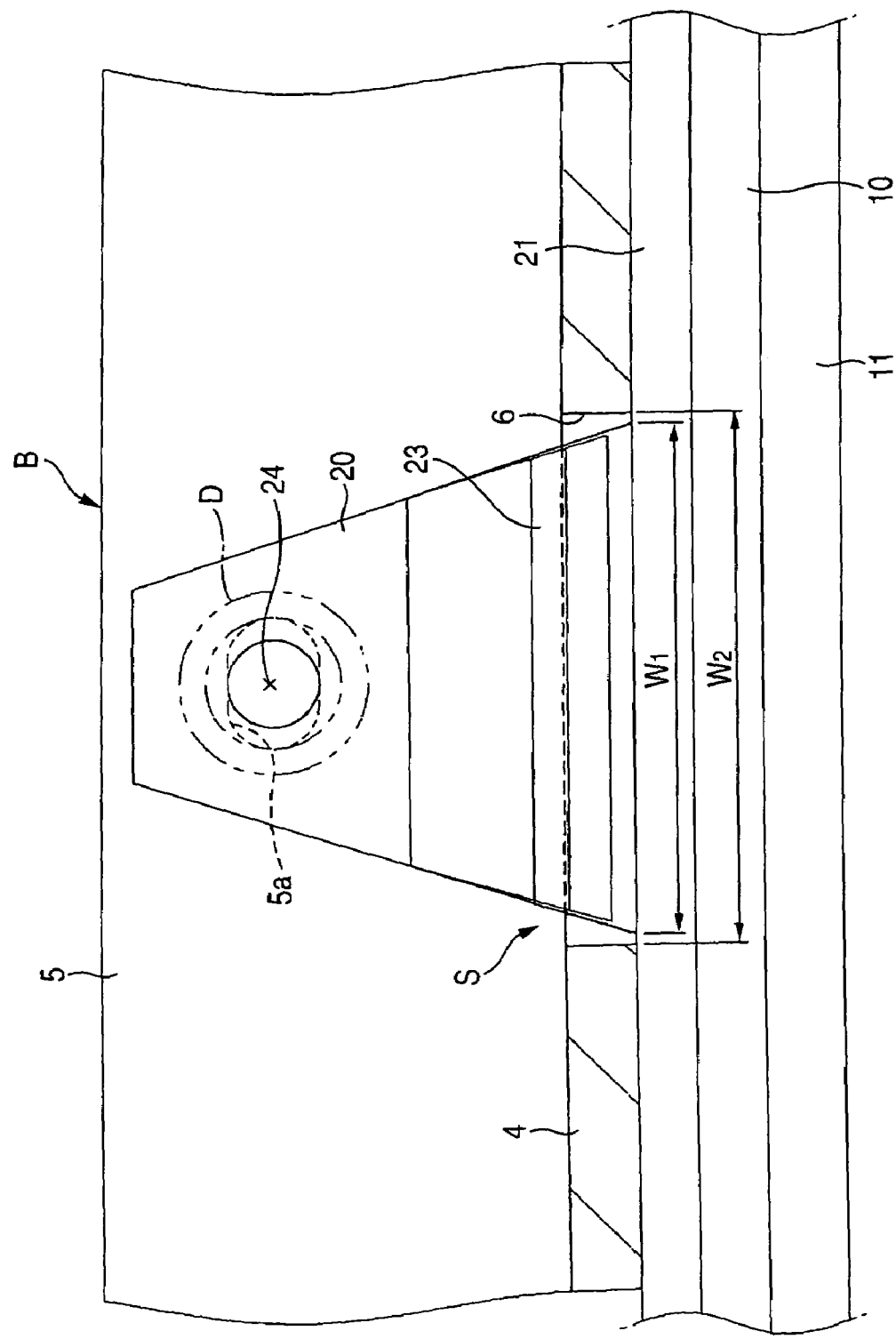
FIG. 10 is a fragmentary cross-sectional plan view when the spoiler is mounted on the bumper.

As shown in FIGS. 3, 8, and 10, in order to facilitate the task of inserting the insert/mount sections 20 into the insert/mount holes 6 of the bumper B, the insert/mount sections 20 of the spoiler S assume a shape whose width is gradually narrowed toward the direction in which the insert/mount sections 20 project from the spoiler main body section 10 and whose tip is substantially tapered, when viewed in plane. The elastically-deformable latching section 23 is formed integrally on the upper surface of the insert/mount section 20. The latching section 23 is formed such that the base end of the insert/mount section 20 (i.e., the portion of the insert/mount section 20 facing the spoiler main body section 10) becomes a free end portion and such that the free end portion projects from an intermediate point of the insert/mount section 20 toward the base end in an upward oblique direction. A latch step section 23b is formed on the upper surface of the free end section by way of a tapered portion 23a. The latching section 23 assumes a shape 23" as indicated by a two-dot chain line shown in FIG. 8 when remaining in a free state before being attached to the bumper B. In relation to the latching section 23" remaining in a free state, a vertical distance from the lower surface of the insert/mount section 20 to the tapered section 23a and the latch step section 23b is set so as to exceed the vertical length of the insert/mount hole 6 of the bumper B. When attached to the bumper B, the latching sections 23 are latched with upper edges of the insert/mount holes 6 by means of restoration force.

The latching sections 23 are preferably formed in such positions that, when the step section of the fitting base section 21 comes into contact with the bottom wall of the spoiler mount groove 1 as a result of the latching sections 23 being attached to the bumper B, the tapered sections 23a of the latching sections 23 come into contact with the upper edges of the insert/mount holes 6. Thus, the force that draws the insert/mount sections 20 acts on the insert/mount sections 20 at all times, thus preventing occurrence of wobble. As shown in FIG. 10, the maximum width ($W_1$) of a base-end part of the insert/mount section 20 is slightly smaller than an inner width ($W_2$) of the insert/mount hole 6 formed at a deep position in the spoiler mount groove 1 of the bumper B. While the respective insert/mount sections 20 of the spoiler S remain inserted into the respective insert/mount holes 6 of the bumper B, a predetermined clearance exists between the insert/mount sections 20 and the insert/mount holes 6. As a result, when the spoiler S is mounted on the bumper B, the clearance absorbs errors stemming from manufacture of the insert/mount sections 20 and the insert/mount holes 6. Even when a difference arises between the insert/mount sections 20 and the insert/mount holes 6 in connection with the amount of thermal expansion or thermal contraction for reasons of a change in temperature, the difference is absorbed by the clearance, whereupon neither tension nor compressive force develops in the spoiler S in the longitudinal direction thereof.

Formed in the respective insert/mount sections 20 of the spoiler S are fastening member insert holes 24 for allowing insertion of fastening members D, such as grommets or grips, which fasten the insert/mount sections 20 to the spoiler mount plate sections 5 of the bumper B. In the illustrated embodiment, the latching sections 23 and the fastening member insert holes 24 are formed in all the insert/mount sections 20. However, the fastening member insert holes 24 are not necessarily formed in all the insert/mount sections 20. For instance, the fastening member insert holes 24 can be arbitrarily adjusted such that the fastening member insert hole 24 is formed in every other insert/mount section 20 in the longitudinal direction, in consideration of mount strength. In this case, not all insert mount sections 20 have to be mounted to the spoiler mount plate sections 5 of the bumper B by way of the fastening members D. As a result, the number of insert/mount sections 20 becomes smaller, thereby enhancing the efficiency of the task of mounting the spoiler S. Here, the latching sections 23 are formed on all the insert/mount sections 20.

As shown in FIGS. 8 and 9, the transverse cross-sectional profile of the fitting base section 21 of the spoiler S assumes such a tapered profile that the fitting base section 21 corresponds to and fits into the spoiler mount groove 1, wherein the heightwise dimension of the fitting base section 21 becomes smaller toward a depthwise direction (i.e., the rearward of the vehicle). The fitting base section 21 is inserted and fitted into the spoiler mount groove 1 without involvement of clearance. In this state, a latch space 25 of the latching section 23 is defined between an upper inner wall surface 6a of the insert/mount hole 6 (see FIG. 8) and an upper surface of the insert/mount section 20.

A tape-like core material 26—which is intended for preventing extraction and contraction of the spoiler S in response to a temperature change and has high expansion-and-contraction resistance—is embedded in the fitting base section 21 of the spoiler S over the entire length thereof. Use of a material which is higher in rigidity and lower in flexibility than the material of the spoiler main body section 10 and that of the insert mount sections 20; e.g., a steel strip (e.g., a metal strip) or the like, for the core material 26 is preferable, because the material can impart rigidity to the spoiler S. Moreover, so long as the tape-like core material 26 is embedded in substantially parallel with the spoiler main body section 10, bending of the spoiler main body section 10 in the thicknesswise direction thereof is allowed. However, the core material exerts force for preventing bending of the spoiler main body section 10 in the direction orthogonal to the thicknesswise direction. Hence, the tape-like core material 26 is more preferable.

The spoiler main body section 10 is deflected such that the front part of the spoiler main body section 10 becomes a slightly convexly-curved surface when viewed in transverse cross section. A shield piece 11 is formed integrally on a front-surface-side of the upper end section of the spoiler main body section so as to face a slanting upward direction, wherein the shield piece 11 comes into elastic contact with a lower surface of the upper-groove-sidewall section 2 when the spoiler S is attached to the bumper B. A plurality of stripes 12 running in the transverse direction (i.e., the vertical direction when the spoiler main body section 10 is attached to the bumper B) are formed continuously in an area on the front surface of the spoiler main body section 10 ranging from a lower end to a substantial center, over the entire length of the spoiler main body section 10. The reason why the stripes 12 (see FIGS. 1 and 3) are provided is that during the course of travel of the vehicle a lower portion of the spoiler main body section 10 may come into contact with a road surface or bumps or the like on the road surface; and that, even when scratches arise as a result of the spoiler main body section 10 having come into contact with the bumps, forming the stripes 12 in the spoiler main body section 10 in the same direction in which the scratches arise renders the scratches less conspicuous, thereby preventing deterioration of decorative characteristic of the spoiler S.

Figure 5:
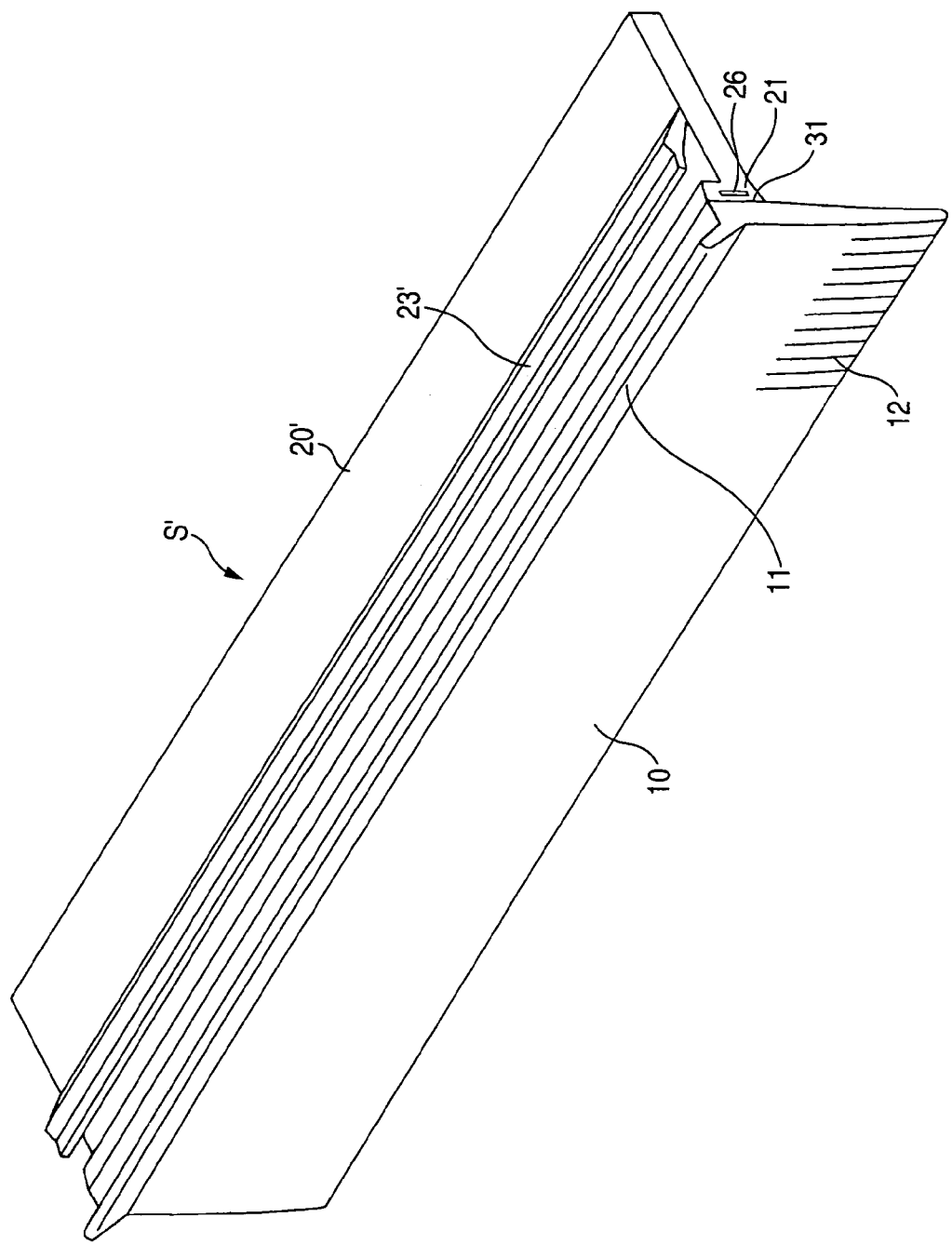
FIG. 5 is a fragmentary perspective view of the bumper spoiler that remains in the state of an intermediate product.
Figure 6:
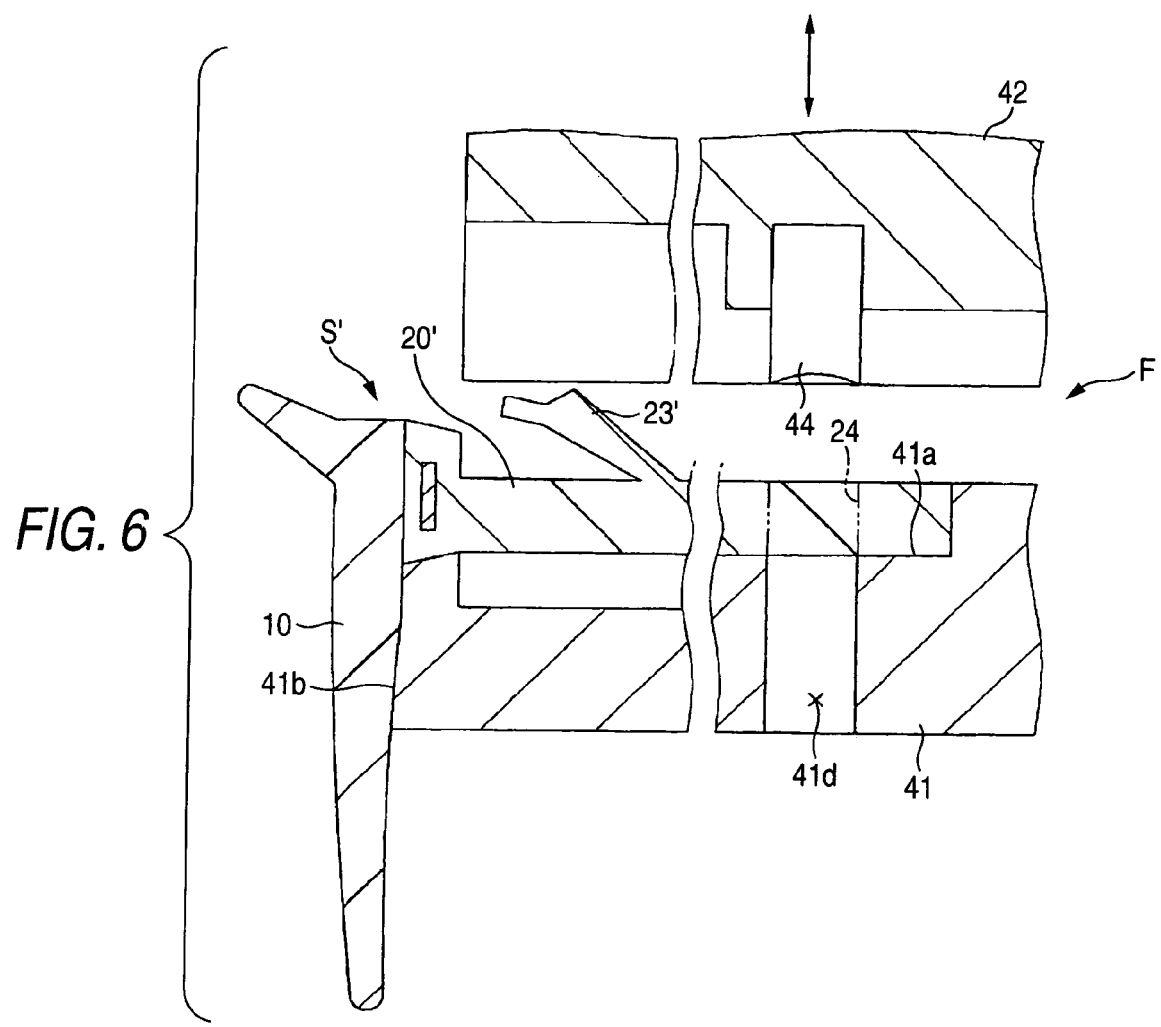
FIG. 6 is a cross-sectional view of a portion of a fastening member insert hole when a preliminary insert/mount section formation section of the bumper spoiler that remains in the state of an intermediate product, is formed through use of a press blank mold.
Figure 7:
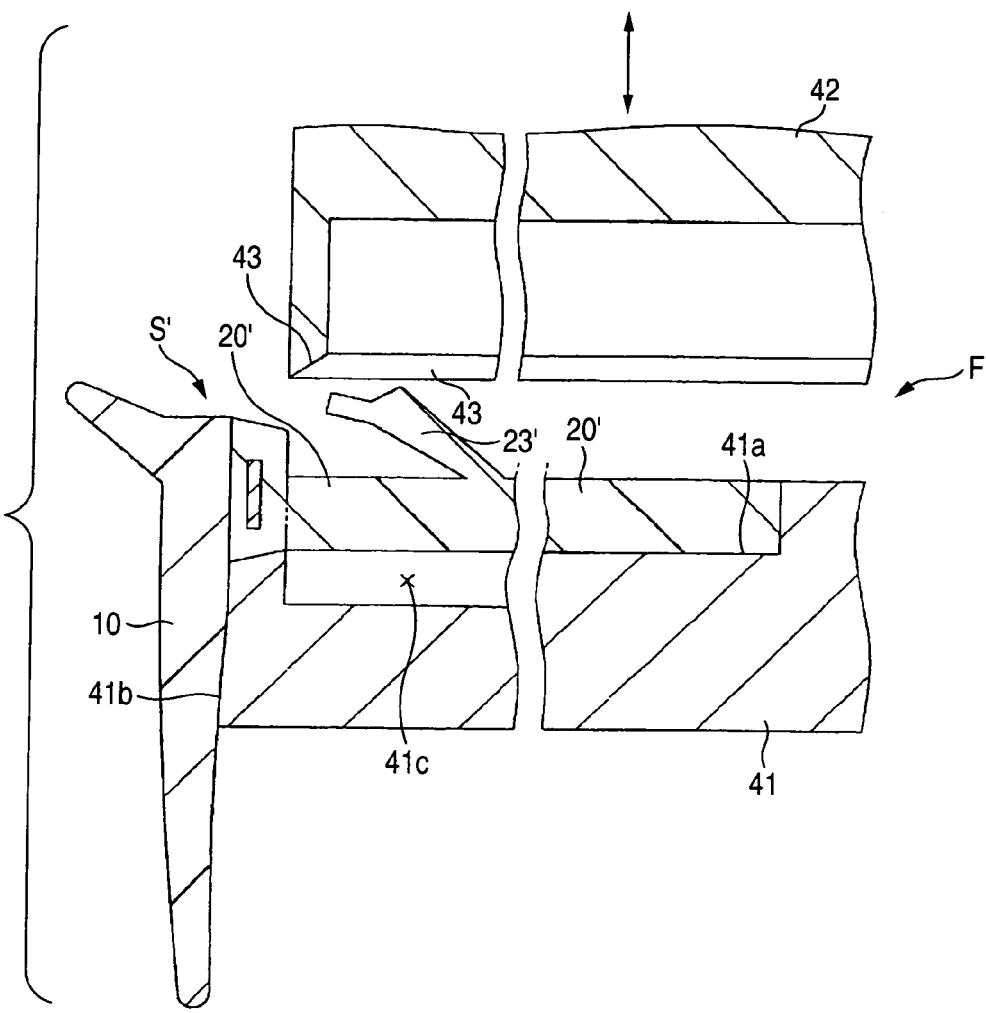
FIG. 7 is a cross-sectional view of a portion of the insert/mount section.

Next, a method for manufacturing the spoiler S will be briefly described. FIG. 5 is a fragmentary perspective view of a bumper spoiler S' remaining in the state of an intermediate product. FIGS. 6 and 7 are cross-sectional views of the bumper spoiler S' remaining in the state of an intermediate product when the fastening member insert holes 24 and the preliminary insert/mount section formation section 20' of the bumper spoiler S' are punched by use of a blank press mold F. First, the spoiler S' that is shown in FIG. 5 and remains in an intermediate state is continuously formed into a long product through extrusion. The spoiler S' remaining in the state of an intermediate product assumes the same cross-sectional profile over the entire length thereof. The spoiler main body section 10, which assumes substantially the same strip-shaped geometry as that of a product; a fitting base section 21, which is formed integrally on an upper portion of the spoiler main body section 10 while being oriented toward the back of the spoiler main body section; the plate-like preliminary insert/mount section formation section 20'; and a preliminary latching section formation section 23' are formed through composite extrusion (also called "co-extrusion") such that they are formed from one material in the spoiler main body section 10 and from another material in the remaining areas. A joint section 31 between the spoiler main body section 10 and the preliminary insert/mount section formation section 20', which are formed from different resin materials having compatibility, is integrally formed while maintaining superior joint strength at the time of extrusion. The preliminary latching section formation section 23', where the latching sections 23 are to be formed from a press blank (through punching), is formed continuously in the preliminary insert/mount section formation section 20' of the spoiler S' that is formed through extrusion and remains in the state of an intermediate product. The core material 26 is extruded into the fitting base section 21 over the entire length of the spoiler main body section 10 while remaining embedded.

The plurality of stripes 12 are formed along the lower front end section of the spoiler S' remaining in the state of an intermediate product, simultaneously with extrusion. The stripes 12 can be readily formed by placing a transfer roller, having fine irregular ridges and grooves formed all around the entire periphery thereof, immediately after extrusion, and bringing the transfer roller into pressing contact with the spoiler main body section 10 of the spoiler S' that is extruded continuously and remains in the state of an intermediate product.

The spoiler S' that has been cut to a predetermined length and remains in the state of an intermediate product is set in the press blank mold F. The preliminary insert/mount section formation section 20' is pressed (or punched) into a predetermined geometry, and the insert/mount sections 20 are formed in the remaining portion. As shown in FIGS. 3 and 4, the blank assumes such a shape that a portion which is to constitute the spoiler main body section 10 is left to a predetermined width over the entire length, and the core material 26 is embedded, to thereby constitute the fitting base section 21. The remaining portion that continuously, integrally extends from the fitting base section 21 to a deeper position (rearward of the vehicle) is left in the form of the insert/mount sections 20 and the latching sections 23, which project toward a deeper position while remaining spaced at given intervals away from each other along the longitudinal direction.

As shown in FIGS. 6 and 7, the press blank mold F is constituted of a lower mold 41 for supporting the spoiler S' that is cut to a predetermined length and remains in the state of an intermediate product, and an upper mold 42 which is placed at a position immediately above the lower mold 41 so as to be able to move in a vertical direction. An upper surface of the lower mold 41 that supports the spoiler S' remaining in the state of an intermediate product constitutes a support surface 41a which supports the preliminary insert/mount section formation sections 20', and the front surface of the lower mold 41 constitutes a contact surface 41b with which the back of the spoiler main body section 10 is brought into contact. A void 41c is formed in an area of the support surface 41a into which a cutting blade 43 of the upper mold 42 is to intrude. A punch hole 41d is formed at a position on the support surface 41a corresponding to a punch 44 of the upper mold 42. The upper mold 42 is provided with the cutting blade 43 to be used for cutting unwanted sections 20a' (see FIG. 4) from the preliminary insert/mount section formation sections 20' of the spoiler S' remaining in the state of an intermediate product and the punch 44 to be used for forming the fastening member insert holes 24 in the insert/mount sections 20 that remain as a result of removal of the unwanted sections 20a'.

The preliminary insert/mount section formation sections 20' of the spoiler S' remaining in the state of an intermediate product are pressed (punched) into predetermined shapes through use of the press blank mold F having the foregoing construction. The plurality of insert/mount sections 20 are formed in the remaining portion at predetermined intervals in the longitudinal direction of the spoiler S. The common fitting base section 21 and the core material 26 are left non-pressed. The fitting base section 21 and the core material 26 extend continuously in the longitudinal direction of the spoiler S. The core material 26, which is formed from a steel strip or the like which is less expandable than materials constituting the spoiler main body section 10 and the insert/mount sections 20, is continuously left in the fitting base section 21. In the embodiment, the strip-shaped core material 26 is embedded such that the surface of the core material 26 becomes substantially parallel with the spoiler main body section 10. A bend in the direction orthogonal to the planar direction of the core material 26 (i.e., a bend in a horizontal surface while the spoiler S is attached to the bumper B) is allowed, and a bend in the transverse direction (i.e., a bend in the vertical plane in the same state) is prevented. Therefore, when the spoiler S is attached to the bumper B, the spoiler S can be bent within the horizontal plane for compliance with the shape of the bumper B. However, the spoiler S assumes a structure which makes a bend in the vertical plane less prone to arise. As a result, even when the bumper B has corner sections having a small curvature radius at both side sections, the spoiler S can be attached to the bumper B while being bent so as to closely follow curves of the corner sections.

Subsequently, a method for mounting the spoiler S to the front bumper B will be described. FIG. 8 is an enlarged cross-sectional view taken along line VIII—VIII shown in FIG. 4 when the spoiler S is attached to the bumper B, and FIG. 9 is an enlarged cross-sectional view taken along line IX—IX shown in FIG. 4 when the spoiler S is attached to the bumper B. The insert/mount sections 20 formed integrally at given intervals in a longitudinal direction are inserted into the respective insert/mount holes 6 formed in the groove bottom wall section 4 constituting the spoiler mount groove 1. The fitting base section 21 provided over the entire length of the spoiler S is fitted into the spoiler mount groove 1 of the bumper B. As shown in FIG. 8, the latching sections 23 formed integrally on the insert/mount sections 20 approach the insert/mount sections 20 by means of elastic deformation in association with insertion of the spoiler and are latched with the upper edge of the insert/mount holes 6 of the bumper B, whereby the spoiler S is temporarily held on the bumper B. When the spoiler S is temporarily held, the latching sections 23 are located rearward of the insert mount holes 6 of the bumper B. Since the latching sections 23 are latched on the upper edge of the insert/mount holes 6, dislodgment of the spoiler S from the bumper B can be prevented while the positions of the insert/mount sections 20 of the spoiler S relative to the spoiler mount plate sections 5 of the bumper B are held.

At the curved portions located at both corner sections of the bumper B, the insert/mount sections 20 of the spoiler S are inserted into the insert/mount holes 6 of the bumper B while the spoiler S is bent along the spoiler mount groove 1 located in the curved portions. The latching sections 23 are latched on the upper edge of the insert mount holes 6. As a result, the spoiler S is temporarily held on the bumper B over the entire length thereof while being slightly curved for compliance with the shape of the bumper B. Here, the tape-shaped core material 26 is embedded in the fitting base section 21 of the spoiler S in substantially parallel with the spoiler main body section 10. The core material allows a bend in the thicknesswise direction of the spoiler main body section 10 but prevents a bend in the direction perpendicular to the thicknesswise direction. The spoiler S can be appropriately bent in compliance with the shape of the bumper B.

Finally, the spoiler S is fully mounted on the bumper B through use of fastening members D such as grommets, clips, or the like. As shown in FIGS. 8 and 10, the fastening member insert holes 5a are formed in the spoiler mount plate section 5 of the bumper B. Hence, the fastening member insert holes 5a are formed in the form of elongated holes in the longitudinal direction of the spoiler S. The fitting base section 21 of the spoiler S is fitted into the spoiler mount groove 1, and the insert/mount sections 20 of the spoiler S are fitted into the insert/mount holes 6 of the bumper B. The fastening member insert holes 24 formed in the respective insert/mount sections 20 of the spoiler S are aligned with the fastening member insert holes 5a of the bumper mount plate sections 5. In this state, the fastening members D are inserted into the fastening member insert holes 24 from above, thereby mounting the insert/mount sections 20 of the spoiler S to the spoiler mount plate sections 5 of the bumper B by way of the fastening members D. The spoiler S is then mounted fully. As a result, mounting of the spoiler S to the bumper B is now completed.

Figure 11:
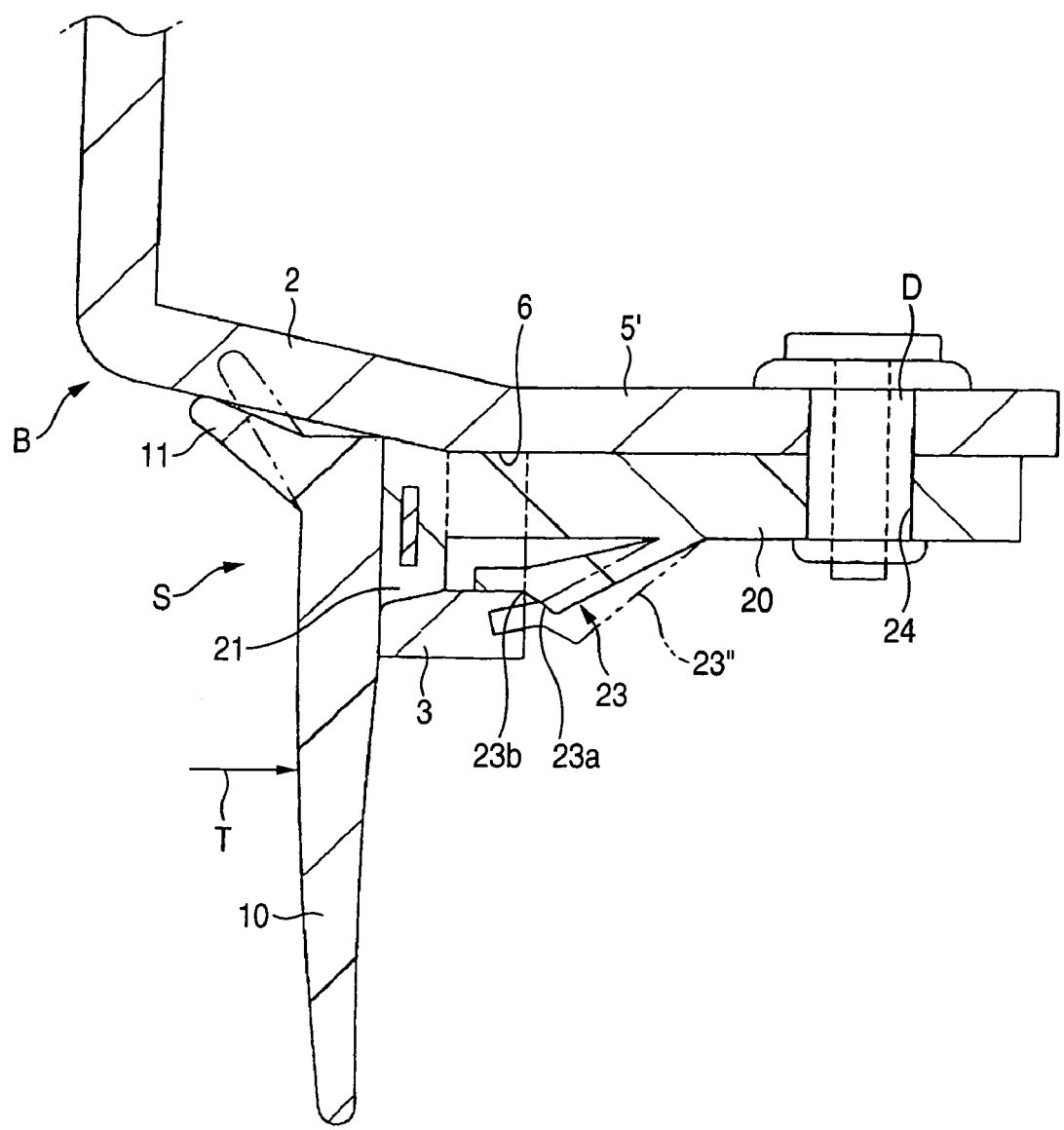
FIG. 11 is a cross-sectional view of the spoiler in a mounted state when latching sections are formed integrally on lower surfaces of the insert/mount sections.

In the embodiment, the latching section 23 formed integrally on the insert/mount section 20 of the spoiler S has a structure such that the latching section 23 is formed on the upper surface of the insert/mount section 20 and is latched with the upper edge of the insert/mount hole 6 while the spoiler S is temporarily held on the bumper B. However, as shown in FIG. 11, the latching section 23 may be formed integrally on the lower surface of the insert/mount section 20 and latched with the lower edge of the insert/mount hole 6. The insert/mount section 20 may be formed so as to have a structure such that the upper-groove-side wall section 2 of the bumper S is brought into contact with a lower surface of a spoiler mount plate section 5' extending rearward of the vehicle and fixed to the spoiler mount plate section 5' by way of the fastening member D. As a result, even when upward rotational force is exerted on the insert mount sections 20 as a result of external force T, such as wind pressure or the like, having acted on the spoiler main body section 10, the rotational force is effectively received by the spoiler mount plate sections 5'. Hence, the insert/mount sections 20 assume a structure which is highly resistant to the external force acting on the spoiler main body section 10.

Figure 12:
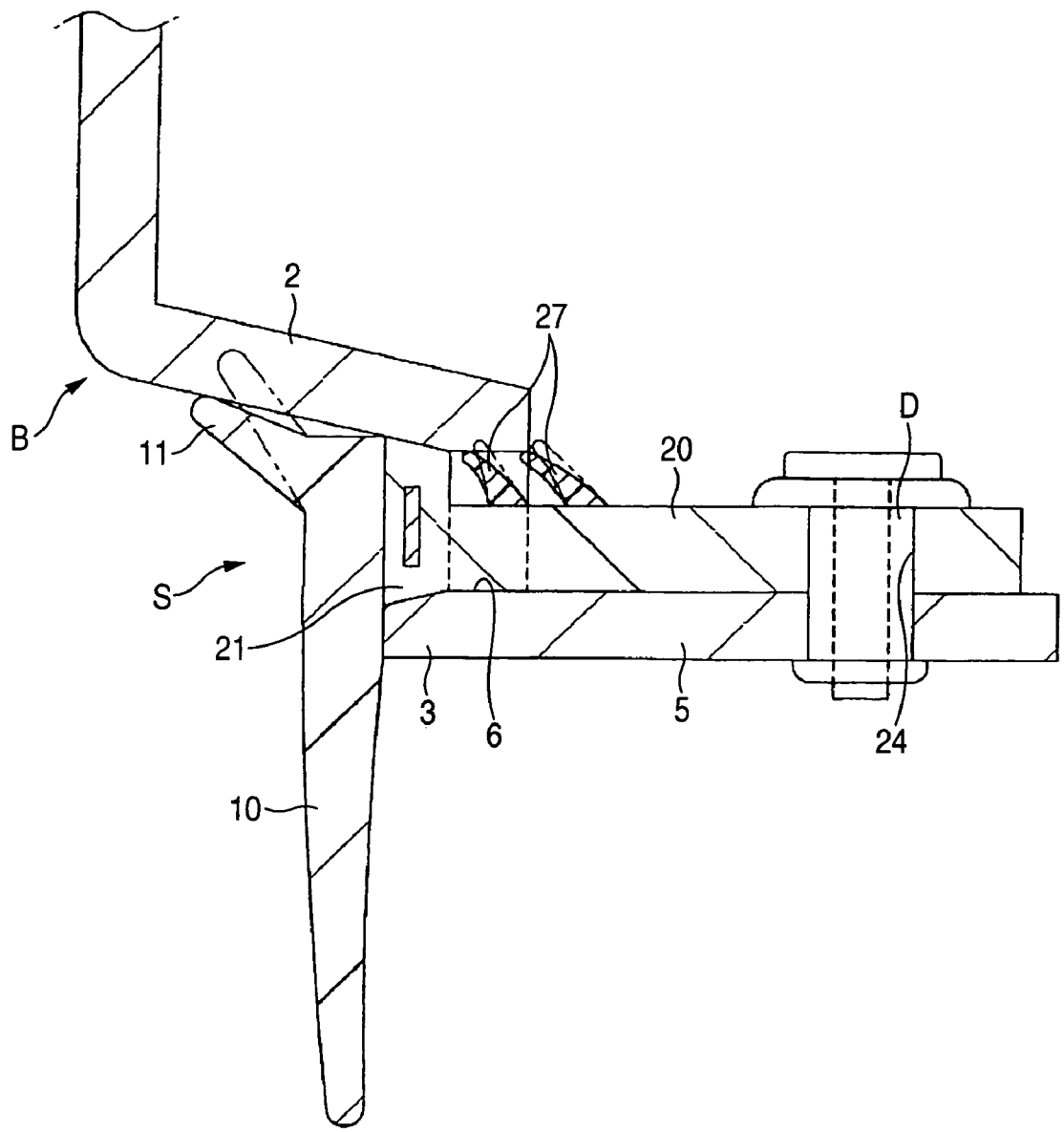
FIG. 12 is a cross-sectional view of the spoiler in a mounted state, wherein latching sections made from material softer than that of the insert/mount sections of the spoiler are formed on upper surfaces of the insert/mount sections.

FIG. 12 is across-sectional view of the spoiler S, wherein a pair of latching sections 27 are formed from material which is softer than that of the insert/mount section 20 of the spoiler S, integrally on the upper surface of the insert/mount section 20 so as to be arranged in the longitudinal direction of the vehicle. The latching sections 27 of the spoiler S are formed integrally on the insert/mount section 20 in a forwardly-inclined position. In a state in which the spoiler S remains mounted, the latching sections 27 come into elastic contact with an upper inner wall surface 6a of the insert/mount hole 6 of the bumper B. The spoiler S is temporarily held on the bumper B, thus preventing dislodgment of the spoiler S from the bumper B. Depending on the shape of the spoiler S, the spoiler S requires strong temporal mounting. In such a case, the latching section 23 can be formed on upper and lower sides of the insert/mount section 20.

The fastening member is not limited to one which is to be inserted such as that employed in the embodiment. For instance, spring steel plate can also be folded into the shape of a substantial letter U, to thereby fasten together the insert/mount section 20 of the spoiler S and the spoiler mount plate section 5 of the bumper B in an overlapping manner. In short, any fastening member can be employed, so long as the spoiler S and the bumper B can be fastened together in an overlapping and unseparable manner.

According to the invention, when a spoiler is mounted on a bumper, there is achieved a structure, wherein latching sections formed on insert/mount sections of the spoiler are temporarily latched with either upper or lower edges of the insert/mount holes of the bumper, thereby preventing dislodgment of the spoiler from the bumper. Therefore, the spoiler is temporarily latched, thereby eliminating positional deviation of the spoiler from the bumper. As a result, full mounting of the spoiler involving use of fastening members becomes easy. Moreover, the insert/mount sections and the latching sections of the spoiler can be readily formed by eliminating unwanted portions from a spoiler remaining in the state of an intermediate product.

The spoiler is readily mounted on the bumper by means of a mount structure of the spoiler. Even when having experienced air resistance, vibration, or the like during the course of traveling of a vehicle, the spoiler does not become deviated from the bumper. During the course of traveling of the vehicle, presence of the spoiler enables effective downward flow of the wind that has hit the spoiler from the front. Further, the main body section of the spoiler is made of soft material having high elasticity. Even when a portion of the spoiler main body section has come into contact with a road surface, the portion becomes resistant to flaws, thus enhancing safety.

What is claimed is:

1. A spoiler configured to be mounted on a bumper of a vehicle, comprising:
    a spoiler main body section having a substantially constant cross-sectional profile along a length thereof and configured to be disposed to orient toward a roadbed on which the vehicle travels;
    a plurality of mount sections each formed on a back of the spoiler main body section integrally therewith to protrude rearward of the vehicle; and
    a plurality of fixing sections integrally formed on at least one of an upper side and a lower side of the plurality of mount sections, the plurality of fixing sections being formed discontinuously in a longitudinal direction of the spoiler at certain intervals, and the plurality of fixing sections each protruding at least one of upward and downward from a surface of the plurality of mount sections from a position between the spoiler main body section and a rear end of each of the plurality of mount sections.

2. The spoiler according to claim 1, wherein the plurality of fixing sections are capable of being fixed in the vicinities of a plurality of mount holes formed in the bumper.

3. The spoiler according to claim 1, wherein the plurality of fixing sections have substantially the same cross-section in a longitudinal direction of the spoiler main body section.

4. The spoiler according to claim 1, further comprising a fitting base section extending along the spoiler main body section, wherein at least one mount section of the plurality of mount sections is integrally formed with the fitting base section.

5. The spoiler according to claim 1, wherein at least one mount section of the plurality of mount sections includes a fastening member mount portion for attaching a fastening member.

6. The spoiler according to claim 5, wherein the fastening member mount portion is formed at a position where the fastening member attached to the fastening member mount portion does not interfere with the fixing section.

7. The spoiler according to claim 5, wherein the fastening member mount portion is a fastening member insert hole into which the fastening member can be inserted.

8. The spoiler according to claim 1,
wherein the spoiler main body section is formed from soft, flexible material which does not undergo any deformation in excess of a limit when subjected to air resistance developing during the course of travel of the vehicle,
the plurality of mount sections are formed from material which is hard and higher in rigidity than a material of the spoiler main body section, and
the back of the spoiler main body section and extremity base portions of the plurality of mount sections are joined integrally with each other.

9. The spoiler according to claim 1,
wherein the spoiler main body section and the plurality of mount sections are made of at least one of rubber and a thermoplastic elastomer material.

10. The spoiler according to claim 1, further comprising: a core material made of a material higher in rigidity and expansion-and-contraction resistance than the spoiler main body section and the plurality of mount sections, the core material embedded in the longitudinal direction in an area on the back of the spoiler main body section where the plurality of mount sections are to be joined.

11. The spoiler according to claim 1,
wherein the plurality of fixing sections are formed on one of upper and lower sides of the respective plurality of mount sections, and
when the spoiler is attached to the bumper, the plurality of fixing sections are elastic in a direction moving closer to the plurality of mount sections, thereby enabling the plurality of mount sections to be pressed against corresponding areas on the bumper.

12. The spoiler according to claim 1, wherein the plurality of fixing sections are integrally formed on the upper side of the plurality of mount sections, and each of the plurality of fixing sections protrudes upward from the surface of the plurality of mount sections.

13. The spoiler according to claim 1, wherein the plurality of fixing sections are integrally formed on the lower side of the plurality of mount sections, and each of the plurality of fixing sections protrudes downward from the surface of the plurality of mount sections.

14. The spoiler according to claim 1, wherein the plurality of mount sections is integrally formed with the main body section by extrusion.

15. The spoiler according to claim 1, wherein the plurality of fixing sections each have a constant cross-sectional profile along an entire length of a respective mount section.

16. The spoiler according to claim 1, wherein the plurality of mount sections and the plurality of fixing sections are provided in a one-piece construction.

17. A spoiler configured to be mounted on a bumper of a vehicle, comprising:
a spoiler main body section configured to be disposed to orient toward a roadbed on which the vehicle travels;
a plurality of mount sections each formed on a back of the spoiler main body section integrally therewith to protrude rearward of the vehicle; and
a plurality of fixing sections integrally formed on at least one of an upper side and a lower side of the plurality of mount sections, the plurality of fixing sections being formed discontinuously in a longitudinal direction of the spoiler at certain intervals, and the plurality of fixing sections each protruding at least one of upward and downward from a surface of the plurality of mount sections from a position between the spoiler main body section and a rear end of each of the plurality of mount sections,
wherein the plurality of mount sections includes a mount section with a fastening member insert hole for attaching a fastening member and a mount section without the fastening member insert hole.

18. The spoiler according to claim 17, wherein the fastening member insert hole is formed at a position where the fastening member attached to the fastening member mount hole does not interfere with the fixing section.

19. The spoiler according to claim 17, wherein the mount section with a fastening member insert hole and the mount section without the fastening member insert hole are arranged alternately with each other.

20. A bumper structure of a vehicle, comprising:
a bumper of the vehicle; and
a bumper spoiler attached to the bumper,
wherein the bumper includes a mount portion formed in a transverse direction of the vehicle, and a plurality of mount holes formed at predetermined intervals in the transverse direction of the vehicle, penetrating through the mount portion; and
the bumper spoiler includes: a spoiler main body section having a substantially constant cross-sectional profile along a length thereof and configured to be disposed to orient in substantially a vertical direction when mounted on the bumper, a plurality of mount sections each formed on a back of the spoiler main body section integrally therewith to protrude rearward of the vehicle, and a plurality of fixing sections integrally formed on at least one of an upper side and a lower side of the plurality of mount sections, the plurality of fixing sections being formed discontinuously in a longitudinal direction of the bumper spoiler at certain intervals, and the plurality of fixing sections each protruding at least one of upward or downward from a surface of the plurality of mount sections from a position between the spoiler main body section and a rear end of each of the plurality of mount sections to be fixed to vicinities of the plurality of mount holes.

21. The bumper structure according to claim 20, wherein a transverse dimension of the mount hole is made greater than a longitudinal width of a base section of the mount section.

22. The bumper structure according to claim 20, wherein the plurality of fixing sections have substantially the same cross-section in a longitudinal direction of the spoiler main body section.

23. The bumper structure according to claim 20, wherein the plurality of mount sections is integrally formed with the main body section by extrusion.

24. The bumper structure according to claim 20, wherein the plurality of fixing sections each have a constant cross-sectional profile along an entire length of a respective mount section.

25. The bumper structure according to claim 20, wherein the plurality of mount sections and the plurality of fixing sections are provided in a one-piece construction.

26. A spoiler configured to be mounted on a bumper including at least one mounting hole, the spoiler comprising:

a spoiler main body section configured to orient in a first direction;

a plurality of mount sections each formed integrally with a back of the spoiler main body section to protrude in a second direction, the plurality of mount sections including an upper side, a lower side opposite the upper side, and a rear end; and a plurality of fixing sections integrally formed with the plurality of mount sections on at least one of the upper side and the lower side to protrude from a surface of the plurality of mount sections, the plurality of fixing sections being formed discontinuously in a longitudinal direction of the spoiler at certain intervals, the plurality of fixing sections being provided at a position between the spoiler main body section and the rear end of the plurality of mount sections, and the plurality of fixing sections including a tapered section and a latch step section, the latch step section being configured to contact at least one of an upper inner wall surface and a lower inner wall surface of the mounting hole and the tapered section including a fixing portion extending at least one of above the upper inner wall surface and below the lower inner wall surface.

27. The spoiler according to claim 26, wherein at least one mount section of the plurality of mount sections includes a fastening member mount portion for attaching a fastening member.

28. The spoiler according to claim 26, wherein the plurality of mount sections includes a mount section with a fastening member insert hole for attaching a fastening member and a mount section without the fastening member insert hole.

29. The spoiler according to claim 26, wherein the plurality of fixing sections have substantially the same cross-section in a longitudinal direction of the spoiler main body section.

30. A spoiler configured to be mounted on a bumper including at least one mounting hole, the spoiler comprising:

a spoiler main body section configured to orient in a first direction;

a plurality of mount sections each formed integrally with a back of the spoiler main body section to protrude in a second direction, the plurality of mount sections including an upper side, a lower side opposite the upper side, and a rear end; and a plurality of first fixing sections and second fixing sections integrally formed with the plurality of mount sections, the plurality of first fixing sections and second fixing sections being formed discontinuously in a longitudinal direction of the spoiler at certain intervals, and the plurality of first fixing sections and second fixing sections being provided on at least one of the upper side and the lower side to protrude from a surface of the plurality of mount sections at a first position and a second position, respectively, between the spoiler main body section and the rear end of the plurality of mount sections, the first position and the second position arranged along the second direction on the same side.

31. The spoiler according to claim 30, wherein at least one mount section of the plurality of mount sections includes a fastening member mount portion for attaching a fastening member.

32. The spoiler according to claim 30, wherein the plurality of insert/mount sections includes a mount section with a fastening member insert hole for attaching a fastening member and a mount section without the fastening member insert hole.

33. The spoiler according to claim 30, wherein the plurality of fixing sections have substantially the same cross-section in a longitudinal direction of the spoiler main body section.

* * * * *